Figure 1:
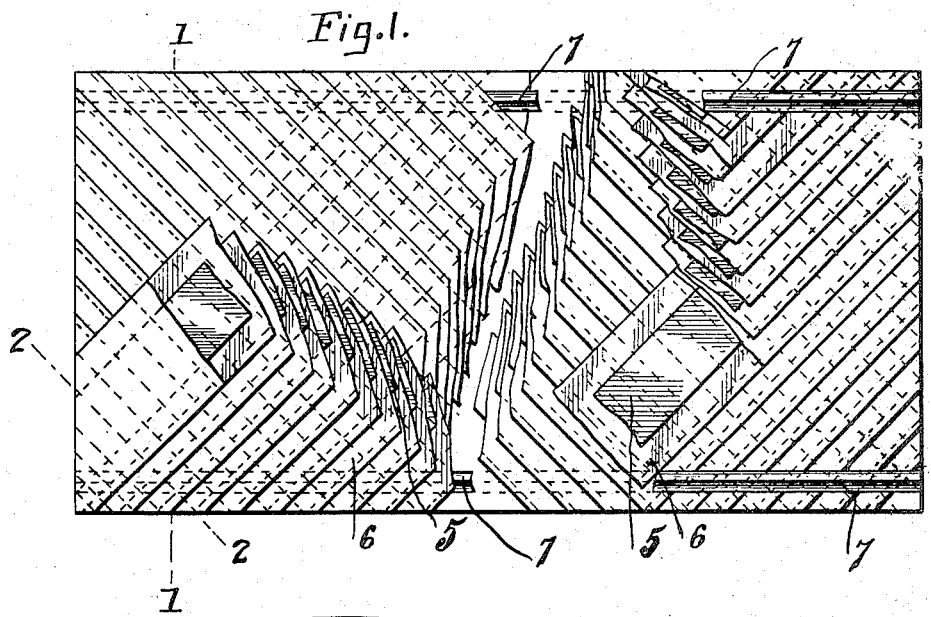

J. T. JOHNSON & F. G. MASON.
METHOD OF MAKING TIRE COVERS.
APPLICATION FILED MAR. 7, 1913.

1,142,042.

Patented June 8, 1915.

WITNESSES

INVENTORS
John T. Johnson and
Frederick G. Mason

Attorney

UNITED STATES PATENT OFFICE.

JOHN THOMAS JOHNSON AND FREDERICK G. MASON, OF CAULFIELD, VICTORIA, AUSTRALIA.

METHOD OF MAKING TIRE-COVERS.

1,142,042.  Specification of Letters Patent.  Patented June 8, 1915.

Application filed March 7, 1913. Serial No. 752,557.

*To all whom it may concern:*

Be it known that we, JOHN THOMAS JOHNSON and FREDERICK GEORGE MASON, subjects of the King of Great Britain, residing at Caulfield, Victoria, Australia, have invented certain new and useful Improvements in Methods of Making Tire-Covers, of which the following is a specification.

This invention relates to an improved method of manufacturing pneumatic tire covers described in our Patent Number 1,062,401, whereby the structure will be stronger and more efficient than the covers now in use.

Pneumatic tire covers are now built up of a series of strips of canvas with or without interlying rubber sheets arranged longitudinally about the tire, but it has been found very difficult to cause the superposed sheets of canvas to perfectly adhere in the curved and annular form. It has been further suggested that a tire cover be made with a strip or strips of canvas coated with a semi-elastic composition which while in a tacky condition is wound under tension in successive convolutions upon a rim or form and subsequently vulcanized to cause the convolutions to combine together in a solid mass. In practice however, the method has been found to be defective owing to the unequal adhesion at the edges of sides of the spirally wound strip or strips.

In a pneumatic tire cover it is of prime importance that the adhesion of the materials composing it shall be as nearly perfect as possible for the purpose of withstanding, as one homogeneous whole, the excessive strains to which a tire is subjected when in use. In devising our invention we have paid special attention to obtaining the best adhesion possible of the parts forming a tire cover, and have illustrated the invention in the accompanying drawings, in which—

Figure 2:
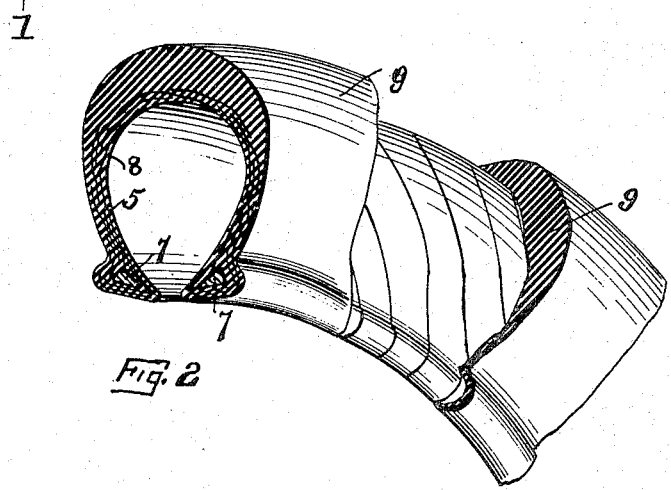
Figure 3:
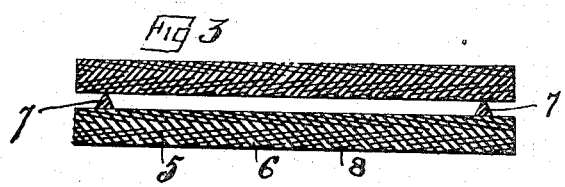
Figure 4:
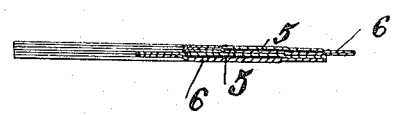

Figure 1 is a plan showing the arrangement of parts used in forming a cover. Fig. 2 shows in perspective view part of a pneumatic tire with the arrangement of strips in accordance with the invention. Fig. 3 is an enlarged sectional elevation on the line 1—1 of Fig. 1, showing the layers of rubber and canvas above and below the beads before the tire is finally formed. Fig. 4 is an enlarged view of part section, on the line 2—2 of Fig. 1, showing two strips and attached rubbers.

In the construction of a pneumatic tire cover according to this invention, we first, cut short strips of a woven fabric out of a sheet of material. It is preferable to cut the strips "on the bias" that is to say, neither along the woof nor the weft, but across each. Each of the strips 5 is faced on both sides with a thin sheet of rubber 6, which may completely cover the fabric so that the latter will be contained within a rubber envelop. The strips are laid upon the "head" used in construction of the tire and formed the shape and about the size of the inner tube of the tire being made, at an angle of about 45° with the face of the wheel and consequently when a second layer is laid on the first but from the other direction, such first and second layers will be at right angles to each other. Each of the strips 5 overlaps its neighbor when along each of its edges a "gutter" is formed which if left unfilled will, owing to the number so constituted, be a source of weakness in the cover by preventing the proper vulcanization of the parts into a solid mass.

To insure the best results in the construction of a tire cover and from the subsequent vulcanizing process we may cause the rubber facings of the strips 5 to overlap on both edges for a distance sufficient, when the strips are laid, to come over the strips beneath and above and to overlap each just enough to fill the gutters formed by the contiguous strips. This arrangement is shown in Fig. 1 of the drawings.

In making a cover, the strips are laid overlapping each other across the former or mold from the right to left and then a second series of overlapping strips is laid at right angles to the first lot from left to right. The number of layers used will depend upon the class of tire required; for very heavy tires six or eight layers may be used, while for a light service as few as two may be sufficient. For ordinary tires four layers will suffice, two being placed under the annular beads 7 and two over the same.

Before commencing to lay the strips on the "head" former or mold we place upon the latter a rubber sheet which entirely covers the same. Upon the rubber sheet 8 we then lay the rubber incased strips in the manner explained.

By using the strips out to a length only sufficient to cross the former diagonally from bead to bead we can be assured of better adhesion of the same when the tire cover is subjected in a press to the process of vulcanization. The fabric being entirely enveloped in rubber will not be visible and the rubber surfaces, the sheet 8 and the rubber 9 will have little difficulty in combining into an integral mass capable of withstanding the many and varied strains to which a tire is subjected during use.

To facilitate laying the strips on the former or mold we have found it convenient to cut and lay the same on the bench in the manner shown in Fig. 1 and then to apply the aggregation to the former. When the requisite number of layers has been put in position the edges of the aggregations of strips are rolled in the usual way upon the beads and when the tread of the tire has been put in position the whole is placed in a heated press for the purpose of vulcanization.

Fig. 3 is intended to represent an exaggerated transverse section of a cover wherein is clearly depicted the manner in which the strips overlap, the rubber being shown cross-hatched in the solid form after vulcanization the better to distinguish the same from the strips 5 shown in heavy lines.

Having now described our invention what we claim as new and desire to secure by Letters Patent is:—

The improved method of making a pneumatic tire cover which consists in the utilization of short strips of woven fabric faced on both sides with rubber so as to envelop a strip and that are then laid in series diagonally upon an annular former or mold, upon which is a rubber sheet, in such a way that each strip of a series overlaps the next strip of the same series, then superposing upon the first series another series of strips at right angles thereto, retaining the whole with annular beads, and vulcanizing the same, with a rubber tread in a press or form, as herein explained.

Signed at Melbourne, Victoria, this 20th day of May 1912, in the presence of two witnesses.

JOHN THOMAS JOHNSON.
FREDERICK G. MASON.

Witnesses:
P. M. NEWTON,
M. ALLAN.